US010880848B2

(12) United States Patent
Keyser-Allen et al.

(10) Patent No.: US 10,880,848 B2
(45) Date of Patent: *Dec. 29, 2020

(54) SYNCHRONIZATION OF CONTENT BETWEEN NETWORKED DEVICES

(71) Applicant: Sonos, Inc., Santa Barbara, CA (US)

(72) Inventors: Lee Keyser-Allen, Medford, MA (US); Thomas Higdon, Boston, MA (US); Luis Vega-Zayas, Arlington, MA (US); Ted Lin, Ayer, MA (US); Andrej Sarkic, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,936

(22) Filed: Feb. 24, 2020

(65) Prior Publication Data

US 2020/0260396 A1 Aug. 13, 2020

Related U.S. Application Data

(63) Continuation of application No. 16/154,685, filed on Oct. 8, 2018, now Pat. No. 10,575,270, which is a
(Continued)

(51) Int. Cl.
*H04W 56/00* (2009.01)
*H04L 29/06* (2006.01)
(Continued)

(52) U.S. Cl.
CPC ....... *H04W 56/0015* (2013.01); *H04L 43/106* (2013.01); *H04L 65/60* (2013.01);
(Continued)

(58) Field of Classification Search
CPC ... H04L 43/106; H04L 65/60; H04N 21/4307; H04N 21/43615; H04N 21/4392;
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
EP 2548379 A1 1/2013
(Continued)

OTHER PUBLICATIONS

Advisory Action dated Apr. 30, 2018, issued in connection with U.S. Appl. No. 14/971,796, filed Dec. 16, 2015, 2 pages.
(Continued)

*Primary Examiner* — Khaled M Kassim

(57) ABSTRACT

A control device of media playback system receives a user command to initiate playback of video content and associated audio content and transmits a BLUETOOTH message based on the command to a video playback device. The video playback device receives the BLUETOOTH message, obtains the media content via a local area network (LAN), and determines an indication of when to begin playback of the media content. The video playback device transmits the indication to an audio playback device via the LAN and outputs the video content in lip-synchrony with playback of the corresponding audio content by the audio playback device. While outputting the video content in lip-synchrony with playback of the corresponding audio content by the audio playback device, the video playback device transmits timing information via the LAN to the audio playback device to maintain lip-synchrony with playback of the corresponding audio content by the audio playback device.

20 Claims, 15 Drawing Sheets

Related U.S. Application Data continuation of application No. 14/971,796, filed on Dec. 16, 2015, now Pat. No. 10,098,082.

(51) Int. Cl.
*H04L 12/26* (2006.01)
*H04N 21/43* (2011.01)
*H04N 21/436* (2011.01)
*H04N 21/439* (2011.01)
*H04N 21/81* (2011.01)
*H04R 27/00* (2006.01)

(52) U.S. Cl.
CPC ..... *H04N 21/4307* (2013.01); *H04N 21/4392* (2013.01); *H04N 21/43615* (2013.01); *H04N 21/8113* (2013.01); *H04R 27/00* (2013.01); *H04R 2227/003* (2013.01); *H04R 2227/005* (2013.01); *H04R 2420/07* (2013.01)

(58) Field of Classification Search
CPC .......... H04N 21/8113; H04R 2227/003; H04R 2227/005; H04R 2420/07; H04R 27/00; H04W 56/0015
See application file for complete search history.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,108,686 A | 8/2000 | Williams, Jr. | |
| 6,256,554 B1 | 7/2001 | DiLorenzo | |
| 6,349,339 B1 | 2/2002 | Williams | |
| 6,404,811 B1 | 6/2002 | Cvetko et al. | |
| 6,469,633 B1 | 10/2002 | Wachter et al. | |
| 6,522,886 B1 | 2/2003 | Youngs et al. | |
| 6,587,127 B1 | 7/2003 | Leeke et al. | |
| 6,611,537 B1 | 8/2003 | Edens et al. | |
| 6,631,410 B1 | 10/2003 | Kowalski et al. | |
| 6,757,517 B2 | 6/2004 | Chang et al. | |
| 6,778,869 B2 | 8/2004 | Champion | |
| 6,826,283 B1 | 11/2004 | Wheeler et al. | |
| 6,985,694 B1 | 1/2006 | De Bonet et al. | |
| 7,124,125 B2 | 10/2006 | Cook et al. | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,739 B2 | 6/2007 | Chang et al. | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,496,623 B2 | 2/2009 | Szeto et al. | |
| 7,496,633 B2 | 2/2009 | Szeto et al. | |
| 7,571,014 B1 | 8/2009 | Lambourne et al. | |
| 7,599,685 B2 | 10/2009 | Goldberg et al. | |
| 7,630,501 B2 | 12/2009 | Blank et al. | |
| 7,643,894 B2 | 1/2010 | Braithwaite et al. | |
| 7,657,224 B2 | 2/2010 | Goldberg et al. | |
| 7,657,910 B1 | 2/2010 | McAulay et al. | |
| 7,725,533 B2 | 5/2010 | Szeto et al. | |
| 7,725,551 B2 | 5/2010 | Szeto et al. | |
| 7,739,271 B2 | 6/2010 | Cook et al. | |
| 7,742,740 B2 | 6/2010 | Goldberg et al. | |
| 7,835,689 B2 | 11/2010 | Goldberg et al. | |
| 7,853,341 B2 | 12/2010 | McCarty et al. | |
| 7,865,137 B2 | 1/2011 | Goldberg et al. | |
| 7,916,877 B2 | 3/2011 | Goldberg et al. | |
| 7,917,082 B2 | 3/2011 | Goldberg et al. | |
| 7,941,761 B2 | 5/2011 | Hally et al. | |
| 7,987,294 B2 | 7/2011 | Bryce et al. | |
| 8,014,423 B2 | 9/2011 | Thaler et al. | |
| 8,023,663 B2 | 9/2011 | Goldberg | |
| 8,028,038 B2 | 9/2011 | Weel | |
| 8,028,323 B2 | 9/2011 | Weel | |
| 8,045,952 B2 | 10/2011 | Qureshey et al. | |
| 8,050,652 B2 | 11/2011 | Qureshey et al. | |
| 8,103,009 B2 | 1/2012 | McCarty et al. | |
| 8,214,873 B2 | 7/2012 | Weel | |
| 8,230,099 B2 | 7/2012 | Weel | |
| 8,234,395 B2 | 7/2012 | Millington | |
| 8,396,800 B1 | 3/2013 | Wieder | |
| 8,483,853 B1 | 7/2013 | Lambourne | |
| 8,788,514 B1 | 7/2014 | Ramanarayanan et al. | |
| 8,942,252 B2 | 1/2015 | Balassanian et al. | |
| 9,344,755 B2* | 5/2016 | Vega .................... | H04R 29/007 |
| 9,489,383 B2 | 11/2016 | Hyman et al. | |
| 9,529,979 B2 | 12/2016 | Torgerson et al. | |
| 9,547,647 B2 | 1/2017 | Badaskar et al. | |
| 9,667,679 B2 | 5/2017 | Lang et al. | |
| 9,674,587 B2 | 6/2017 | Triplett et al. | |
| 9,699,522 B2* | 7/2017 | Kim .................... | H04N 21/8547 |
| 9,967,615 B2 | 5/2018 | Coburn, IV et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0056117 A1 | 5/2002 | Hasegawa et al. | |
| 2002/0124097 A1 | 9/2002 | Isely et al. | |
| 2002/0154691 A1* | 10/2002 | Kost .................... | H04N 21/6125 375/240.01 |
| 2003/0001016 A1 | 1/2003 | Fraier et al. | |
| 2003/0157951 A1 | 8/2003 | Hasty | |
| 2004/0024478 A1 | 2/2004 | Hans et al. | |
| 2004/0072584 A1 | 4/2004 | Kern | |
| 2004/0088328 A1 | 5/2004 | Cook et al. | |
| 2004/0143603 A1* | 7/2004 | Kaufmann .............. | G09B 5/08 |
| 2005/0256722 A1 | 11/2005 | Clark et al. | |
| 2006/0047704 A1 | 3/2006 | Gopalakrishnan | |
| 2006/0095401 A1* | 5/2006 | Krikorian ............ | H04N 19/172 |
| 2006/0143236 A1 | 6/2006 | Wu | |
| 2006/0149850 A1 | 7/2006 | Bowman | |
| 2006/0200545 A1 | 9/2006 | Fromentoux et al. | |
| 2006/0253436 A1 | 11/2006 | Cook et al. | |
| 2007/0088747 A1 | 4/2007 | Cheng et al. | |
| 2007/0100966 A1 | 5/2007 | Peng et al. | |
| 2007/0107019 A1 | 5/2007 | Romano et al. | |
| 2007/0142944 A1 | 6/2007 | Goldberg et al. | |
| 2007/0294131 A1 | 12/2007 | Roman et al. | |
| 2008/0052371 A1 | 2/2008 | Partovi et al. | |
| 2008/0056675 A1 | 3/2008 | Wright et al. | |
| 2008/0104268 A1 | 5/2008 | Farber et al. | |
| 2008/0189293 A1 | 8/2008 | Strandel et al. | |
| 2008/0205856 A1* | 8/2008 | Kim .................. | H04N 21/64322 386/290 |
| 2009/0100147 A1* | 4/2009 | Igarashi ............ | H04N 21/6408 709/218 |
| 2009/0136210 A1* | 5/2009 | Morimoto .......... | H04N 21/8456 386/241 |
| 2009/0150491 A1 | 6/2009 | Yamamoto | |
| 2009/0180534 A1* | 7/2009 | Hluchyj ........... | H04N 21/23424 375/240.01 |
| 2009/0204842 A1* | 8/2009 | Tetik ........................ | G06F 1/12 713/400 |
| 2009/0222514 A1* | 9/2009 | Igarashi ............ | H04N 21/43615 709/203 |
| 2009/0307062 A1 | 12/2009 | Lutnick et al. | |
| 2010/0017366 A1 | 1/2010 | Robertson et al. | |
| 2010/0075313 A1 | 3/2010 | Kreuwel et al. | |
| 2010/0095332 A1 | 4/2010 | Gran et al. | |
| 2010/0128176 A1* | 5/2010 | Nakajima .......... | H04N 21/4341 348/512 |
| 2010/0205222 A1 | 8/2010 | Gajdos et al. | |
| 2010/0262909 A1 | 10/2010 | Hsieh | |
| 2010/0281108 A1* | 11/2010 | Cohen .................. | H04N 21/458 709/203 |
| 2011/0004468 A1* | 1/2011 | Fusakawa ............ | H04R 25/353 704/214 |
| 2011/0246623 A1* | 10/2011 | Pantos .................. | H04L 65/608 709/219 |
| 2012/0071996 A1 | 3/2012 | Svendsen | |
| 2012/0117183 A1 | 5/2012 | Wong et al. | |
| 2012/0210225 A1 | 8/2012 | McCoy et al. | |

(56) References Cited

U.S. PATENT DOCUMENTS

| | | | |
|---|---|---|---|
| 2012/0210353 A1 | 8/2012 | Wong et al. | |
| 2013/0070860 A1* | 3/2013 | Schramm | H04L 67/06 375/240.25 |
| 2013/0198298 A1* | 8/2013 | Li et al. | H04N 21/4307 709/206 |
| 2013/0263193 A1* | 10/2013 | Hirano | H04N 21/2668 725/88 |
| 2013/0268980 A1* | 10/2013 | Russell | H04N 21/6332 725/75 |
| 2013/0343567 A1* | 12/2013 | Triplett | G06F 16/68 381/77 |
| 2014/0010515 A1* | 1/2014 | Lee | H04L 65/605 386/207 |
| 2014/0189648 A1 | 7/2014 | Everitt | |
| 2014/0323036 A1* | 10/2014 | Daley | H04H 20/08 455/3.06 |
| 2015/0025661 A1* | 1/2015 | Vega-Zayas | H04N 21/26258 700/94 |
| 2015/0036695 A1* | 2/2015 | Gowda | H04L 47/283 370/474 |
| 2015/0067016 A1* | 3/2015 | Park | H04L 65/80 709/201 |
| 2015/0150146 A1 | 5/2015 | Torgerson et al. | |
| 2015/0172756 A1* | 6/2015 | Coburn, IV | H04L 29/06027 725/81 |
| 2015/0179227 A1* | 6/2015 | Russell | H04N 21/4122 386/201 |
| 2015/0234820 A1 | 8/2015 | Aravamudan et al. | |
| 2015/0293917 A1* | 10/2015 | Bufe, III | G06F 16/24575 706/12 |
| 2016/0078903 A1* | 3/2016 | Chitnis | G11B 27/10 386/219 |
| 2016/0080739 A1* | 3/2016 | Perlman | A63F 13/355 375/240.07 |
| 2016/0088037 A1* | 3/2016 | Lang | H04L 67/10 709/219 |
| 2016/0088339 A1* | 3/2016 | Nakanishi | H04N 9/8042 725/74 |
| 2016/0100031 A1 | 4/2016 | Wood et al. | |
| 2016/0150344 A1 | 5/2016 | Filev et al. | |
| 2016/0269128 A1 | 9/2016 | Gautama et al. | |
| 2017/0026686 A1 | 1/2017 | Glazier et al. | |
| 2017/0093943 A1 | 3/2017 | Alsina et al. | |
| 2017/0171577 A1* | 6/2017 | Kipp | H04N 21/242 |
| 2017/0251040 A1* | 8/2017 | Archambault | H04N 21/4305 |
| 2017/0289231 A1 | 10/2017 | Powell et al. | |
| 2020/0117416 A1* | 4/2020 | Vega Zayas | H04N 21/439 |

FOREIGN PATENT DOCUMENTS

| | | |
|---|---|---|
| JP | 2008500614 A | 1/2008 |
| JP | 2009141746 A | 6/2009 |
| KR | 100890993 | 3/2009 |
| WO | 200153994 | 7/2001 |
| WO | 2003093950 A2 | 11/2003 |
| WO | 2005119948 A2 | 12/2005 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, Chinese Office Action dated May 5, 2016, issued in connection with Chinese Patent Application No. 201280056773.0, 18 pages.
Chinese Patent Office, Second Office Action dated Jan. 20, 2017, issued in connection with Chinese Application No. 201280056773.0, 15 pages.
Chinese Patent Office, Third Office Action dated Sep. 26, 2017, issued in connection with Chinese Application No. 201280056773.0, 4 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Examination Report dated Jan. 26, 2016, issued in connection with European Application No. 12833511.4, 6 pages.
European Patent Office, European Extended Search Report dated Mar. 8, 2018, issued in connection with EP Application No. 17198086.5, 5 pages.
European Patent Office, European Office Action dated Jul. 30, 2019, issued in connection with European Application No. 16828813.2, 9 pages.
European Patent Office, Office Action dated Sep. 29, 2016, issued in connection with European Application No. 12833511.4, 6 pages.
European Patent Office, Summons to Attend Oral Proceedings dated May 12, 2020, issued in connection with European Application No. 16828813.2, 8 pages.
Final Office Action dated Jun. 12, 2015, issued in connection with U.S. Appl. No. 13/239,077, filed Sep. 21, 2011, 21 pages.
Final Office Action dated Jul. 12, 2018, issued in connection with U.S. Appl. No. 14/990,283, filed Jan. 7, 2016, 14 pages.
Final Office Action dated Jul. 15, 2019, issued in connection with U.S. Appl. No. 15/973,443, filed May 7, 2018, 26 pages.
Final Office Action dated Jan. 18, 2018, issued in connection with U.S. Appl. No. 14/971,796, filed Dec. 16, 2015, 17 pages.
Final Office Action dated Jun. 29, 2018, issued in connection with U.S. Appl. No. 14/990,235, filed Jan. 7, 2016, 11 pages.
First Action Interview Office Action dated Mar. 7, 2019, issued in connection with U.S. Appl. No. 15/973,443, filed May 7, 2018, 4 pages.
International Bureau, International Preliminary Report on Patentability dated Apr. 3, 2014, issued in connection with International Application No. PCT/US2012/056467, filed on Sep. 21, 2011, 11 pages.
International Bureau, International Preliminary Report on Patentability, dated Jun. 28, 2018, issued in connection with International Application No. PCT/US2016/065640, filed on Dec. 16, 2015, 12 pages.
International Searching Authority, International Search Report and Written Opinion dated Feb. 24, 2017, issued in connection with International Application No. PCT/US2016/065640, filed on Dec. 8, 2016, 15 pages.
International Searhing Authority, International Search Report and Written Opinion dated Feb. 28, 2013, issued in connection with International Application No. PCT/US2012/056467, filed on Sep. 21, 2012, 12 pages.
Japanese Patent Office, Final Office Action dated Mar. 8, 2016, issued in connection with Japanese Patent Application No. JP2014-531990, 10 pages.
Japanese Patent Office, Final Office Action dated Aug. 16, 2016, issued in connection with Japanese Patent Application No. 2014-531990, 6 pages.
Japanese Patent Office, Office Action dated Jun. 13, 2017, issued in connection with Japanese patent application No. 2016-113766, 7 pages.
Japanese Patent Office, Translation of Office Action dated Jun. 13, 2017, issued in connection with Japanese Patent Application No. 2016-113766, 3 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.

(56) References Cited

OTHER PUBLICATIONS

Non-Final Office Action dated Oct. 21, 2014, issued in connection with U.S. Appl. No. 13/239,077, filed Sep. 21, 2011, 18 pages.
Non-Final Office Action dated Apr. 25, 2013, issued in connection with U.S. Appl. No. 13/239,077, filed Sep. 21, 2011, 21 pages.
Non-Final Office Action dated Dec. 1, 2017, issued in connection with U.S. Appl. No. 14/990,235, filed Jan. 7, 2016, 18 pages.
Non-Final Office Action dated Aug. 10, 2017, issued in connection with U.S. Appl. No. 14/971,796, filed Dec. 16, 2015, 17 pages.
Non-Final Office Action dated Dec. 6, 2017, issued in connection with U.S. Appl. No. 14/990,283, filed Jan. 7, 2016, 20 pages.
Non-Final Office Action dated Jan. 9, 2020, issued in connection with U.S. Appl. No. 16/142,689, filed Sep. 26, 2018, 9 pages.
Notice of Allowance dated Oct. 7, 2019, issued in connection with U.S. Appl. No. 16/154,685, filed Oct. 8, 2018, 10 pages.
Notice of Allowance dated Dec. 9, 2015, issued in connection with U.S. Appl. No. 13/239,077, filed Sep. 21, 2011, 9 pages.
Notice of Allowance dated Jan. 9, 2018, issued in connection with U.S. Appl. No. 15/280,979, filed Sep. 29, 2016, 14 pages.
Notice of Allowance dated Oct. 9, 2019, issued in connection with U.S. Appl. No. 15/973,443, filed May 7, 2018, 5 pages.
Notice of Allowance dated Sep. 19, 2018, issued in connection with U.S. Appl. No. 14/990,235, filed Jan. 7, 2016, 10 pages.
Notice of Allowance dated Apr. 22, 2020, issued in connection with U.S. Appl. No. 16/142,689, filed Sep. 26, 2018, 8 pages.
Notice of Allowance dated Oct. 25, 2018, issued in connection with U.S. Appl. No. 14/990,283, filed Jan. 7, 2016, 10 pages.
Notice of Allowance dated Jul. 26, 2018, issued in connection with U.S. Appl. No. 14/971,796, filed Dec. 16, 2015, 15 pages.
Palm, Inc., "Handbook for the Palm VII Handheld," May 2000, 311 pages.
Pre-Brief Appeal Conference Decision mailed on Sep. 14, 2018, issued in connection with U.S. Appl. No. 14/990,235, filed Jan. 7, 2016, 2 pages.
Preinterview First Office Action dated Aug. 29, 2017, issued in connection with U.S. Appl. No. 15/280,979, filed Sep. 29, 2016, 6 pages.
Preinterview First Office Action dated Nov. 5, 2018, issued in connection with U.S. Appl. No. 15/973,443, filed May 7, 2018, 5 pages.
Presentations at WinHEC 2000, May 2000, 138 pages.
United States Patent and Trademark Office, U.S. Appl. No. 14/971,796, filed Dec. 16, 2015, entitled "Synchronization of Content Between Networked Devices", 68 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
Non-Final Office Action dated Jun. 23, 2020, issued in connection with U.S. Appl. No. 16/696,316, filed Nov. 26, 2019, 25 pages.

* cited by examiner

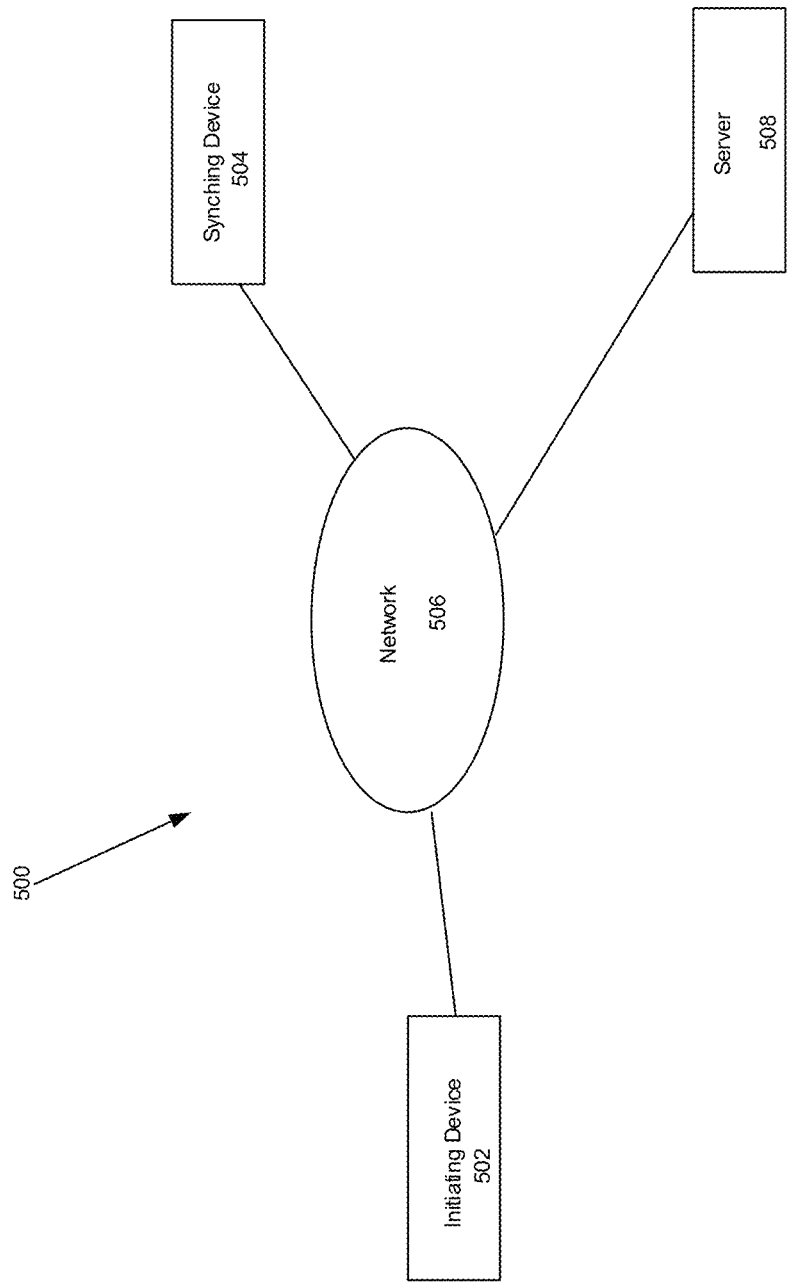

SYNCHRONIZATION OF CONTENT BETWEEN NETWORKED DEVICES

CROSS REFERENCE TO RELATED APPLICATIONS

This application claims priority under 35 U.S.C. § 120 to, and is a continuation of, U.S. patent application Ser. No. 16/154,685 filed Oct. 8, 2018 and entitled "Synchronization of Content Between Networked Devices", which is a continuation of, U.S. patent application Ser. No. 14/971,796, now U.S. Pat. No. 10,098,082, filed Dec. 16, 2015 and entitled "Synchronization of Content Between Networked Devices", each of which is hereby incorporated by reference in its entirety for all purposes.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play audio in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 5A shows an example network configuration;

Figure 1:
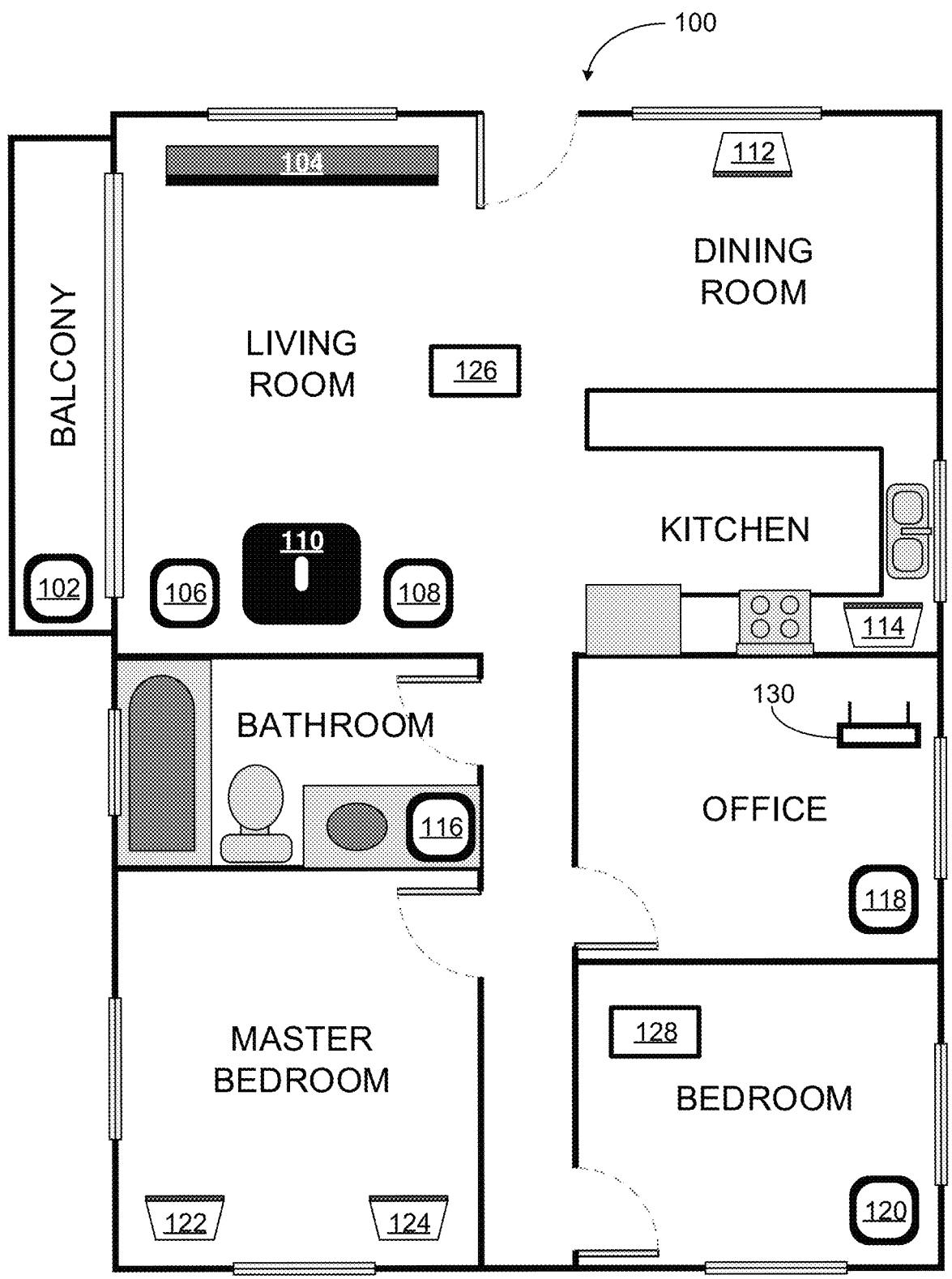
FIG. 1 shows an example playback system configuration in which certain embodiments may be practiced.

The drawings are for the purpose of illustrating example embodiments, but it is understood that the embodiments are not limited to the arrangements and instrumentality shown in the drawings.

DETAILED DESCRIPTION

I. Overview

Synchronized playback of audio and video content on separate networked devices requires a synchronization process. Synchronization enables video content to be played back in synchrony with the associated audio content. Certain embodiments disclosed herein enable synchronization of playback devices.

A communication network may communicatively couple the playback devices. The communication network may be any suitable network, such as a WiFi network, Bluetooth network, cellular network, or a satellite network, among other examples. The playback device may be arranged to play back audio and video content. Audio and/or video content may be transported across the communication network in the form of packets, for example, to the playback devices. In this regard, the network device may receive this content and play back the audio and/or video content.

Latency or jitter conditions on the communication network may affect playback of audio and video content. Latency can be a measure of a delay in a one way trip of the packet from one device on the network to another device on the network. Jitter can be a measure of the variance in the one-way trip time.

The communication network may or may not be suitable for audio/video communications depending on the amount of latency or jitter on the network. For video, for instance, low latency may be defined as less than 40 ms delay in a one-way trip of a packet from a first device to a second device on the network for a 25 frame per second video sequence, although other examples of low latency may exist. Low jitter may be defined as plus or minus 20 ms variance in a one-way trip time for the 25 frame per second video sequence, although other examples of low jitter may exist. Suitable network conditions may be low latency or low jitter. For example, if an audio playback device and video playback device retrieves audio content and video content respectively from a server on the network for playback, any latency or jitter greater than the low latency or low jitter amounts may lead to unsuitable synchronization of audio and video.

The latency and jitter of a network can be measured, for example, using a test packet. The test packet may be a packet specifically sent by a network device for determining the network latency or a packet. Alternatively, the test packet may also serves another purpose and be used for determining latency and/or jitter.

For example, a video device can send a test packet to an audio playback device. The test packet may have header which indicates routing information to the audio playback device and a payload. The video device may have an onboard local clock responsible for maintaining hardware timing within the audio playback device. The payload of the packet may define a time on the local clock of the video device when the test packet was sent.

The communication network may route the test packet from the video device to the audio playback device. The audio playback device may receive the test packet and send an acknowledgement packet back to the video device. The acknowledgement packet may include the time which was in the payload of the test packet sent by the video device. At the time of receipt of the acknowledgement packet, the video device may again note the time on its local clock. A difference between when the test packet is sent to when the acknowledgment was received is a round trip time of the packet. One half of the time of the round trip time may be indicative of the latency of the communication network.

The test packet may be sent multiple times and acknowledgements may be received multiple times. Variations in the one way times may be indicative of jitter. Further, several measurements can be performed and averaged together to provide a mean latency and a mean jitter. The mean latency and mean jitter may be a characterization of the communication network. This characterization may be performed prior to playback of audio or video content or in the event that the communication network is known to have a latency or jitter concerns.

An initiating device and a synching device may be involved in playback of media content. The initiating device may be device which indicates start of the playback. For example, example, the initiating device may be a video playback device which plays back video content. The synching device may be a device which is arranged to playback audio or video in synchronization with the initiating device. In this example, the synching device may be an audio playback device which plays the audio associated with the video content of the video playback device.

The initiating device may send a packet to the synching device. The packet may identify a location of content to play where the location may be indicated by an addressing link such as a universal resource indicator (URI). The URI may indicate the location of content to be played, which may be on an initiating device or on some other device in the network and may include the protocol by which to retrieve it. The URI may also be known as a universal resource locator (URL).

The packet may also include a presentation timestamp which indicates a place in the content where playback should be initiated. For example, the presentation timestamp may indicate that within a one minute video file, the content is to start playback at the 30 second mark. The packet may also define an indication of when to play the content. This indication may be a length of time until the playback starts as determined with reference to the local clock of the initiating device and referred to herein as a delta value. The delta value may enable the synching device to playback content in synchronization with the initiating device.

The synching device may extract the URI and the delta value from the packet when the synching device receives the packet. The initiating device and synching device may also obtain the content to be played back based on the URI. At this point, the initiating device and the synching device may be ready to play the content indicated by the URI. One device may play back audio and another device may play back video corresponding to the audio, albeit in some instances both devices may be playing back the same content. Further, each device may play the content starting at the designed presentation timestamp. A delta value may indicate the time when the initiating device is to play the content. For instance, the delta value can indicate to play at a time equal to the local clock time of the initiating device plus the delta value. Similarly, the time to play the content on the synching device may be at a time equal to the time of the local clock of the synching device when the packet is received plus the delta value. The delta value enables the synching device to playback content in synchronization with the initiating device. In some instances, the delta value may be corrected by the network latency to further improve synchronization.

For example, if the local clock of the synching device indicates 1000 ms when the synchronization packet is received and the time when the content is to be played back (e.g., delta value) is 10 ms in the future, then the content at the designated presentation timestamp may be played back on the synching device when the local clock equals 1010 ms. At the time of the local clock on the initiating device plus the delta value, the initiating device may also play the content. For example, if the local clock of the initiating device indicates 1005 ms when the packet is sent and the time when the content is to be played back is 10 ms, then the content at the presentation timestamp may be played back on the initiating device when the local clock equals 1015 ms. In some examples, the delta value may be subtracted by the network latency and used by the synching device depending on network conditions. After playback of the first frame, synching device may refer to subsequent presentation timestamps in the content to present subsequent frames of content and its local clock to maintain playback timing. The presentation timestamps in the content may indicate timing information. For example, if the presentation timestamps in the content indicates to play a frame each 40 ms, then each frame may be played every 40 ms as timed by the local clock. Note that the frame size for the audio frames and the video frames need not be equivalent.

Updates may be sent over time to account for variations in the timing ("drift") between the local clock of the initiating device and the local clock of the synchronizing device during playback of the content. The update may take the form of a synchronization packet. These updates may need only to be sent in one direction between devices thus yielding a unidirectional synchronization for content playback.

The synchronization packet sent by the initiating device may allow for calculating a presentation offset value. In the event that the packet defines a new delta value, then the synching device may adjust a rate of playback based on this received new delta value and the calculated presentation offset. The presentation timestamp in the content may specify when a particular frame of content is to be presented. The synching device may use the presentation timestamp in the content to calculate an expected time of the local clock when the particular frame of content is to be played. The difference between the expected time and the current local time is an expected delta value. The received new delta value may define when the synching device should present the particular frame. The variation between the expected delta value and the received new delta value indicated in the synchronization packet, e.g., presentation time offset, may be used to adjust a speed of the local clock on the synching device. In one example, a ratio of the difference between the expected delta value and the received new delta value to the received new delta value may be used to adjust the clock speed on the synchronizing device.

An example of the use of this method and apparatus may be in a home theatre system. The home theatre system may have a video playback device such as a television and an audio playback device such as a speaker separated by a communication network. In this regard, a user may initiate via the video playback device playback of video content. The video playback device may send a packet to the audio playback device defining a URI and a delta value which indicates when to play back the content, e.g., a length of time until playback starts. The audio playback device may receive this packet, determine the current time of its local clock, and add the delta value to the current time to determine the local clock time when the audio content should be played. In some examples, the delta value may be adjusted by the latency of the network. The audio playback device may also obtain audio content using the URI, for example, from a server on the network or even the video device itself. At the local time when the audio content should be played, the audio playback device may play back the audio content. The video playback device may use the same delta value to playback the video based on its local clock.

In this regard, the audio playback device can use the delta value to synchronize playback of the audio content with the video content played by the video playback device. Accordingly, the video and audio playback devices may monitor each of its own respective the local clock until it indicates a time later at which the audio playback device may play the audio content and the video playback device may play the video content. The local clock of the audio playback device and the video device may not require a separate synchronization process during video and audio playback.

Moving on from the above illustration, an example embodiment includes a first device comprising a network interface configured to communicate with a second device and a third device over a network; a processor comprising instructions, which when executed, cause the processor to: receive, by the first device from the second device over the network, an identifier of content to play and an indication of when to play the content; determine, by the first device, a local clock time to play the content, the local clock time to play the content based on a time of a local clock of the first device and the indication of when to play the content; obtain, by the first device from the third device over the network, the content to play based on the received identifier of content to play; and play, by the first device, the obtained content based on the time of the local clock and the local clock time to play the content. The indication of when to play the content may be associated with a network latency. The network latency may be based on a mean of a round trip packet delay between the first device and the second device. The identifier of content to play may be a URI which facilitates access to the content on the third device via the network.

The instructions for receiving, by the first device from the second device over the network, the identifier of content to play may further comprise receiving a presentation timestamp which indicates a location in the content to start playback. The indication of when to play the content may be a length of time until playback starts, and the instructions for determining, by the first device, a local clock time to play the content may comprise adding the length of time until playback starts to the time of the local clock. The content may comprise a plurality of frames, and the indication of when to play the content is a length of time until playback of a frame.

The first device may further comprise instructions to receive a synchronization packet comprising a new length of time until playback of a frame, determine an expected length of time until playback of the frame based on a presentation timestamp embedded in the content and the time of the local clock, wherein the presentation timestamp indicates a timing of playback for the content, and adjust a clock speed of the local clock based on the expected length of time until playback of a frame and the new length of time until playback of a frame.

The instructions for adjusting the clock speed may comprise calculating the following expression: (Delta E-DeltaR)/(Delta_R) where Delta_E is the expected length of time until playback of the frame and Delta_R is the new length of time until playback of the frame. The first device may further comprise instructions to play, by the first device, the content in synchronization with the second device based on presentation timestamps embedded in the content, the presentation timestamps indicating timing of playback for the content. The instruction for receiving, by the first device from the second device over the network, an identifier of content to play may comprise receiving a packet with a sequence number. The first device may further comprise instructions to send, by the first device, an acknowledgement packet from the first device to the second device, the acknowledgment packet including the sequence number of the packet. The second device may use this round-trip time as the basis of a latency calculation. A network latency may be subtracted from the indication of when to play the content. The network latency may be subtracted by either the first device or the second device.

Another example embodiment may include a method for synchronizing playback between a first device and a second device, the method comprising receiving, by the first device from the second device over a network, an identifier of content to play and an indication of when to play the content; determining, by the first device, a local clock time to play the content, the local clock time to play the content based on a time of a local clock of the first device and the indication of when to play the content; obtaining, by the first device from a third device over the network, the content to play based on the received identifier of content to play; and playing, by the first device, the obtained content based on the time of the local clock and the local clock time to play the content. A network latency may be subtracted from the indication of when to play the content. The latency may be subtracted by the first device or the second device. The method of determining, by the first device, a local clock time to play the content may comprise subtracting, by the first device, a network latency from the indication of when to play the content.

The first device may be an audio playback device, the content may comprise audio content and video content, and the method of playing, by the first device, the content may comprise dropping, by the first device, the video content and playing the audio content. The method may further comprise receiving a synchronization packet which defines at least one of a new presentation timestamp, a new length of time until playback of a frame, and a new clock generation number. The content may comprise a plurality of frames, and wherein the indication of when to play the content is a length of time until playback of a frame. The method may further comprise receiving a synchronization packet comprising a new length of time until playback of a frame, determining an expected length of time until playback of a frame based on a presentation timestamp embedded in the content and the time of the local clock, wherein the presentation timestamp indicates a timing of playback for the content, and adjusting a clock speed of the local clock based on the expected length of time until playback of a frame and the new length of time until playback of a frame. The method may further comprise playing, by the synchronizing device, the content in synchronization with the second device based on presentation timestamps embedded in the content, the presentation timestamps being indicative of a timing of playback for the content.

In yet another example embodiment, a computer readable storage medium may include instructions for execution by a processor, the instructions, when executed, cause the processor to implement a method comprising: receiving, by the first device from the second device over a network, an identifier of content to play and an indication of when to play the content; determining, by the first device, a local clock time to play the content based on a time of a local clock of the first device and the indication of when to play the content; obtaining, by the first device from a third device over the network, the content to play based on the received identifier of content to play; and playing, by the first device, the obtained content based on the time of the local clock and the local clock time to play the content. The content may comprise a plurality of frames, and the indication of when to play the content may be a length of time until playback of a frame. The method may further comprise instructions to receive a synchronization packet which defines a new length of time until playback of a frame; determine an expected length of time until playback of a frame based on presentation timestamps embedded in the content and the time of the local clock; and adjust a clock speed of the local clock based on the expected length of time until playback of a frame and the new length of time until playback of a frame.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control device 126, 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
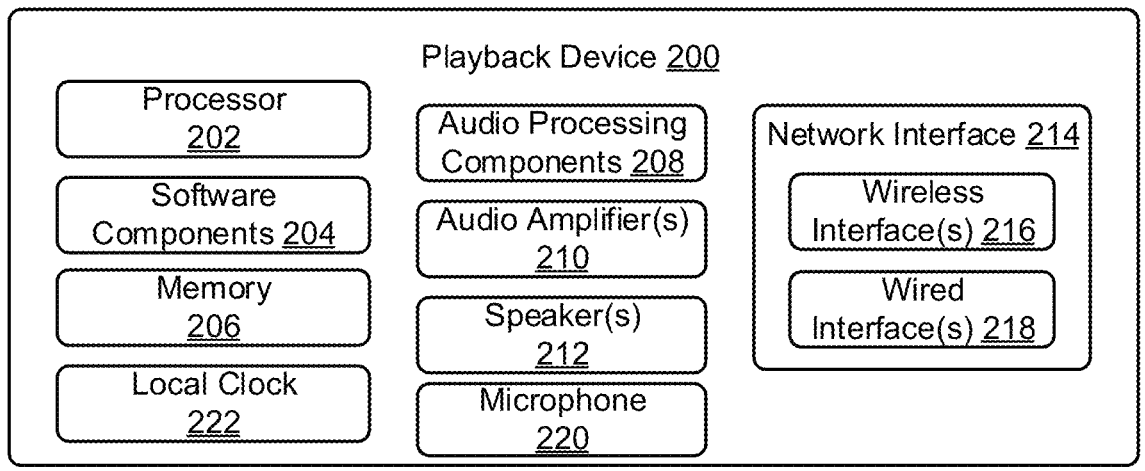
FIG. 2 shows a functional block diagram of an example playback device.

FIG. 2 shows a functional internal block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a computing component configured to process input data according to instructions stored in the memory 206. The processor 202 may be driven in some examples by a local clock 222 which may be a hardware circuit such as a timer, oscillator, voltage controlled oscillator, crystal, or counter which maintains timing on the example playback device 200. In other arrangements the local clock 222 may be a combination of hardware and software. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. The speaker(s) 212 may also be capable of beam-steering, e.g., playing audio sound in such a way as to aim the audio sound at a particular angle within a window of the playback device. In some instances, independently addressable drivers of the speakers(s) 212 enable beam-steering through physically altering the direction of one or more drivers or offsetting phase for each a given set of audio drivers to aim the sound. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection), or the network interface 214. The playback device may be equipped with a microphone 220 or microphone array 220. The microphone(s) 220 may be an acoustic-to-electric transducer or sensor that converts sound into an electrical signal. The microphone(s) 220 may be used to detect the general location of an audio source. The electrical signal of the microphone(s) 220 may need to be amplified before being further processed. Accordingly, an amplifier such as audio amplifier 210 may also receive the electrical signal from the microphone 220 and amplify it for further processing by the audio processing components 208. The electrical signal may be processed by the audio processing components 208 and/or the processor 202. The microphone 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including Bluetooth, WiFi, IEEE 802.11a, 802.11b, 802.11g, 802.11n, 802.11ac, 802.15, 4G mobile communication standard, near field communication (NFC) and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
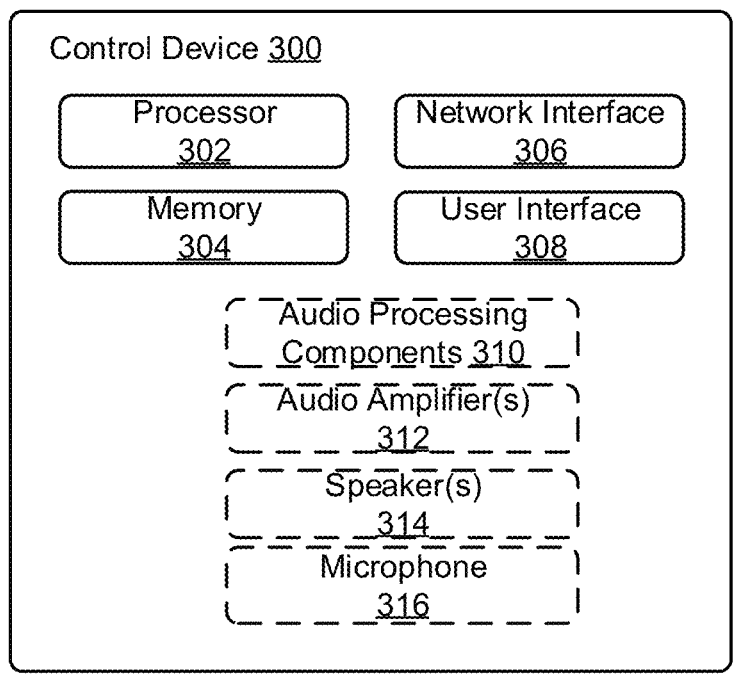
FIG. 3 shows a functional block diagram of an example control device.

FIG. 3 shows a functional block diagram of an example control device 300 that may be configured to be the control device 126 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including Bluetooth, WiFi, IEEE 802.11a, 802.11b, 802.11g, 802.11n, 802.11ac, 802.15, 4G mobile communication standard, near field communications (NFC) and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

In some embodiments, the control device 300 may also be equipped with capability to play back audio sound. According, the control device 300 may have optionally have audio processing components 310, audio amplifier 312, speaker 314 and microphone(s) 316 shown in FIG. 3 as dotted line boxes.

Figure 4:
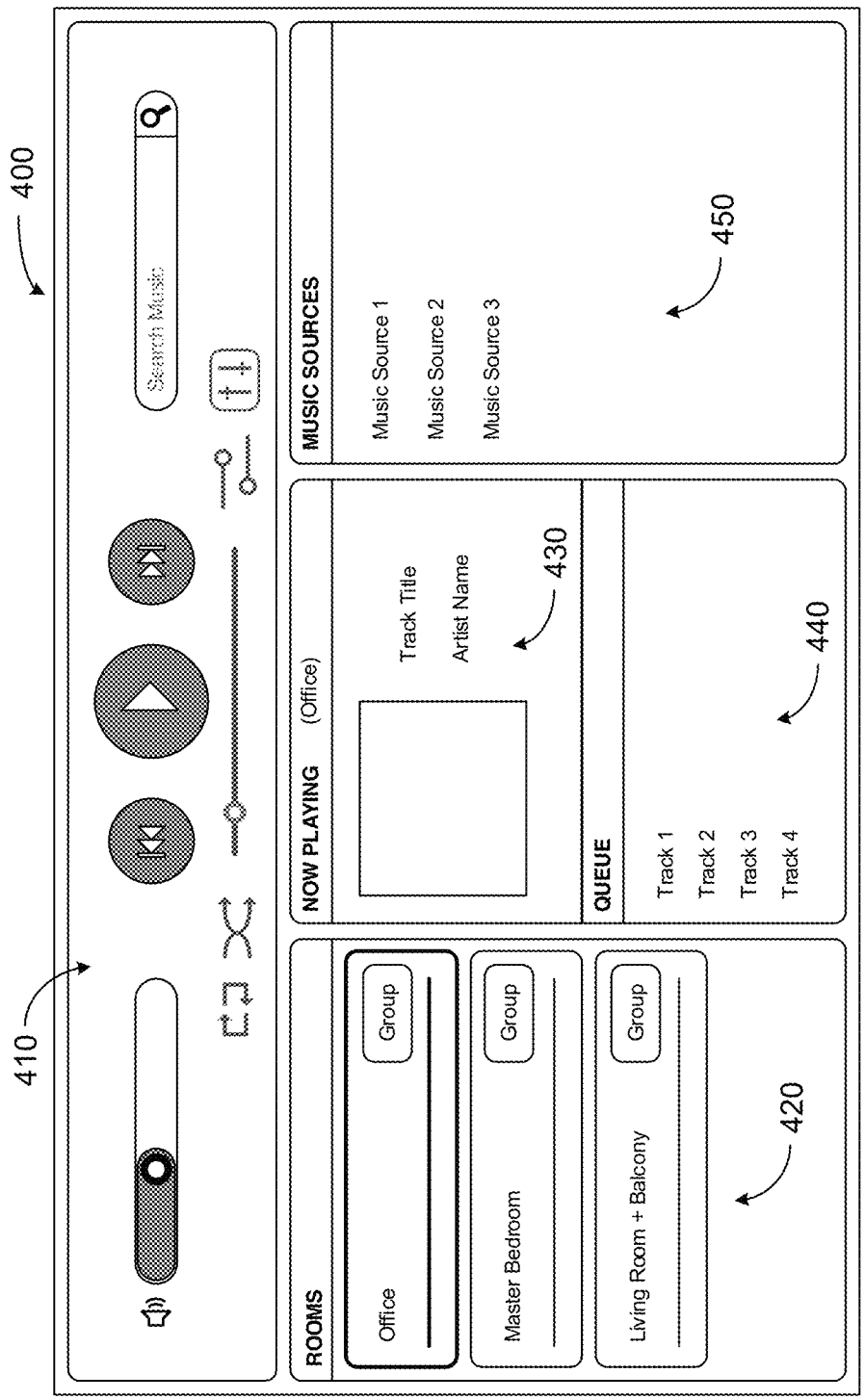
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example System for Synchronization of Content Between Networked Devices

FIG. 5A shows an example network configuration 500 where an initiating device 502 may be communicatively coupled to a synching device 504 through a communication network 506. The initiating device 502 and synching device 504 may be configured to play audio content, video content, or a combination of audio and video content in synchrony in accordance with embodiments described herein.

The communication network 506 may be, for example, a WiFi network, Bluetooth network, cellular network, satellite network, or the Internet. The communication network 506 may transmit and receive data between the initiating device 502 and the synching device 504. Additionally, a server 508 may be coupled to the communication network. The server 508 may be a computer system or data storage system configured to store media content such as audio content, video content, or a combination of audio and video content.

In the event that an initiating device or synching device does not have the content to be played back locally, the server 508 may also send the audio and video content to the initiating device 502 and/or synching device 504 for playback. The content may take the form of packets or frames, for example, which for purposes of discussion, may be considered equivalent data structures. In this regard, the initiating device 502 and the synching device 504 may receive different types of media, the same type of media, or a combination of the same and different media from the server 508 and play back the content.

Figure 5B:
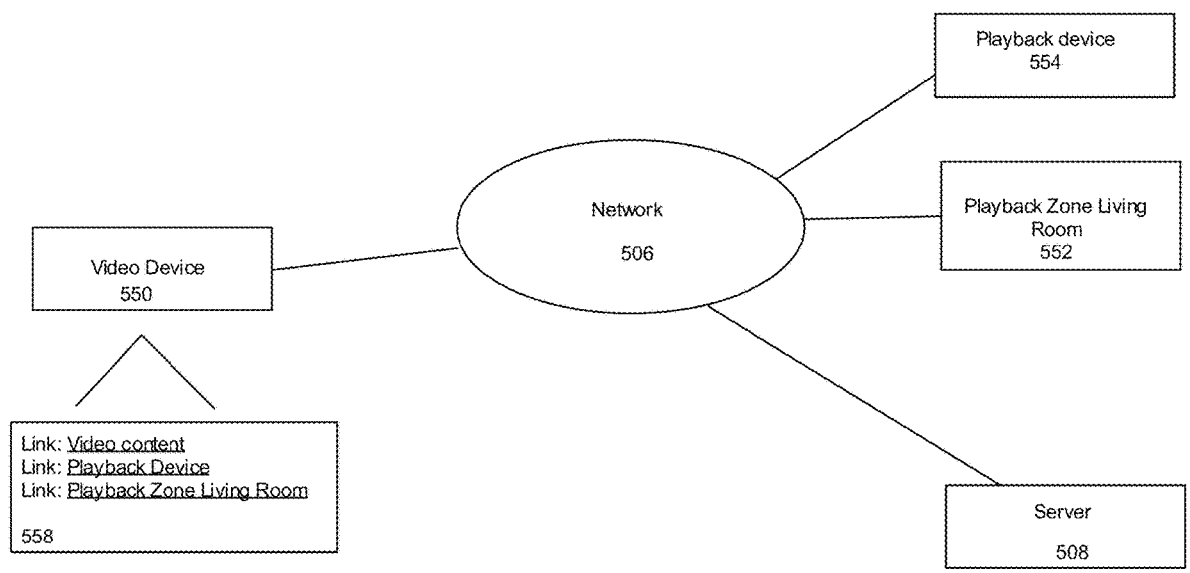
FIG. 5B shows another example network configuration.

FIG. 5A generally describes an example network configuration where the initiating device 502 and synching device 504 may take many forms, including audio devices or video devices. FIG. 5B shows the network configuration 500 of FIG. 5A where the initiating device is a video device 550 and the synchronizing device is one or more audio playback devices 552, 554. The one or more audio playback devices may in some instances define a zone of audio playback devices.

The video device 550 may be arranged to playback video and cause the audio to be played back on one or more of the audio playback devices 552, 554. For example, the video device 550 may be a television, a computer, or a mobile device such as the control device for controlling an audio playback system. The television may enable playback of video content upon a channel being selected. In the case of the computer or mobile device, a user interface may enable selection of video content, such as in a web browser 558. The web browser 558 may have a link to the video content. Additionally, or alternatively, the video device may show or have one or more indications associated with the audio playback devices 552, 554. These indications may be selectable such that the video is played back on the video device 550 and the audio is played back on the selected audio playback device. For example, the indications may take the form of links in the web browser 558 that are selectable to cause audio content to be played back to a respective audio playback device 554 or playback zone living room 552. Upon selecting a link or channel, the video content may be played back on the video device 550 (e.g., a computer) and the audio content may be retrieved from the server 508 and played back on selected the audio playback device 554 or playback zone 552. US Patent Publication 20150253960 (Ser. No. 14/197,403) entitled "Webpage Media Playback", the contents of which are incorporated herein in their entirety, describes a process of using a web browser to select zones for audio playback in an audio playback system.

Latency or jitter conditions on the communication network 506 may affect playback of audio and video content. Latency may be a measure of a delay in a one way trip of a packet from one device on the communication network 506 to another device on the communication network 506. Jitter may be a measure of the variance in the one-way trip time. The communication network 506 may or may not be suitable for audio/video communications depending on the amount of latency or jitter on the network as this may affect synchronization of audio and video playback.

Suitable network conditions may be a low latency or a low jitter network. For video content, low latency may be defined as less than a 40 ms delay in a one way trip of a packet from a first device to a second device on the network for video sequence although other examples of low latency may exist. Low jitter may be defined as a plus or minus 20 ms variance in a one-way trip time for the video sequence although other examples of low jitter may exist. In other words, if an audio playback device and video playback device retrieves audio content and video content respectively from the server 508 on the network, any latency or jitter greater than the low latency or low jitter amounts may lead to perceivable synchronization problems between the audio and video during playback on the initiating device 502 and the synching device 504. The synchronization problems might be evidenced as lack of lip synchronization between the audio and video content.

Figure 6:
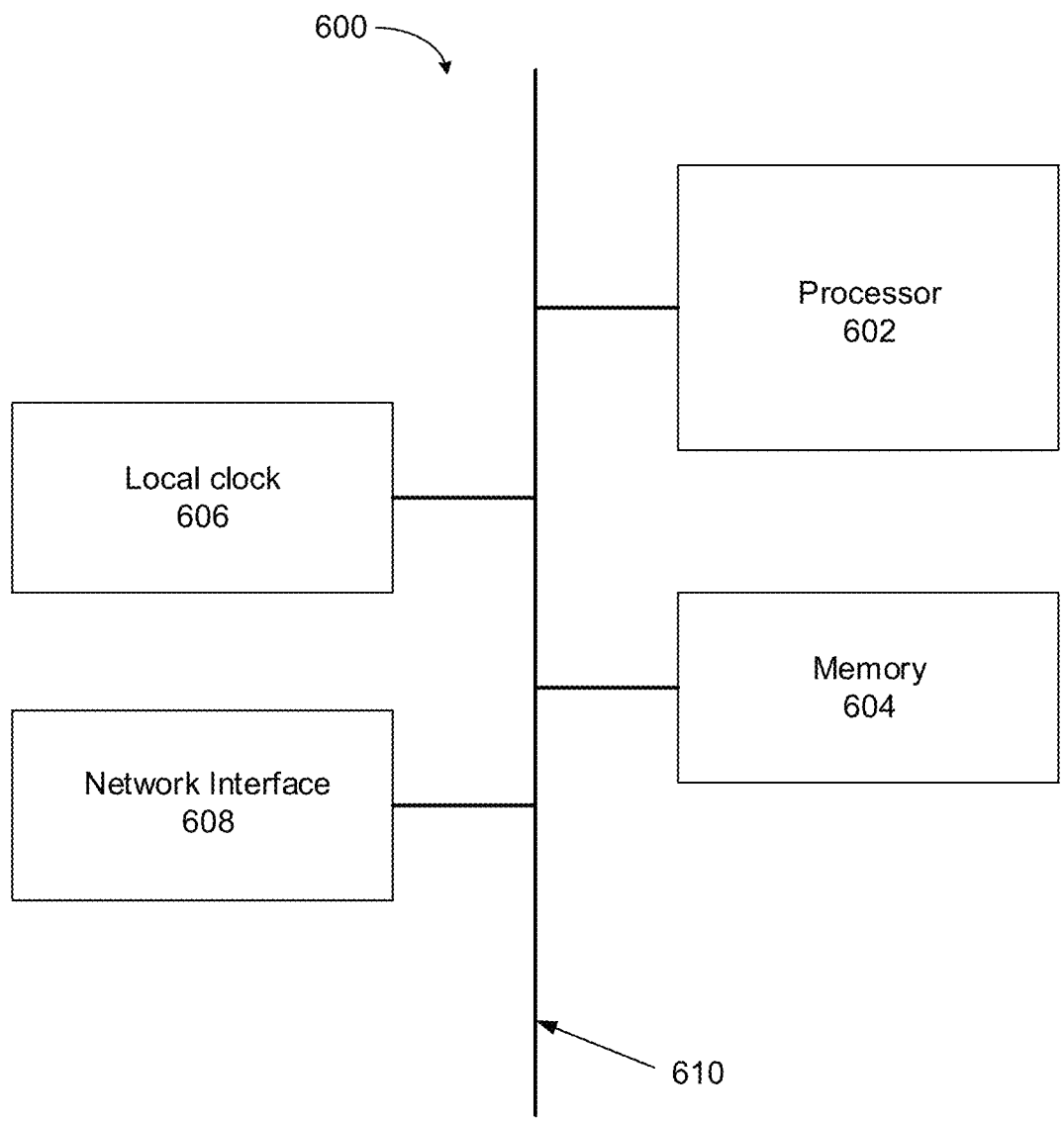
FIG. 6 is an example structure for an initiating device or a synching device.

FIG. 6 is an illustration of an example structure of the initiating device 502 or synching device 504 (referred to for purposes of FIG. 6 as the device 600) for performing the various functions described herein. The initiating device 502 and synching device 504 may be the audio playback device, a video playback device, or generally a media playback device.

The device 600 may include a processor 602, memory 604, local clock 606, and network interface 608 communicatively coupled to a bus 610 or some other mechanism for providing communication as between the processor 602, memory 604, local clock 606, and network interface 608. The memory 604 may be read only memory, random access memory, a hard drive, removable computer readable media, or database for instance for storing data. The processor 602 may have an arithmetic processing logic and be capable of executing computer instructions stored in the memory 604 for performing the various functions disclosed herein. The local clock 606 may be a timer, clock, oscillator, voltage controlled oscillator, or some other hardware or software mechanism for maintaining hardware timing on the device 600. The network interface 608 may facilitate network communications over the communication network 606. The network communications may include transmission of data, for example, packets or frames, over the communication network 606.

Figure 7:
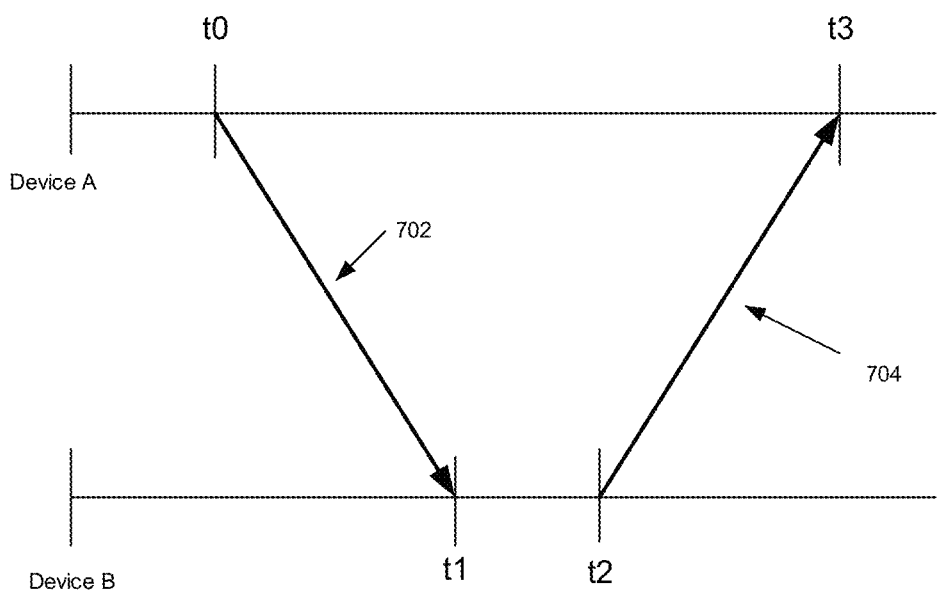
FIG. 7 is an example timing diagram for determining network latency of a communication network.

FIG. 7 illustrates an example timing diagram for determining the latency and jitter of the communication network 506. The timing diagram shows a timeline of data communications as between two devices on the communication network 506. In FIG. 7, the devices are labeled as device A and device B, where device A and device B may be capable of transmitting and receiving data such as an audio playback device, video playback device, or generally a media playback device. The latency and jitter of a communication network 506 may be determined by sending and receiving a test packet, test frame, or some other burst of data from device A to device B.

Device A may have a clock for maintaining timing information such as local clock 606. In this regard, device A can send a packet 702 with a timestamp to device B. Alternatively, device A may provide some indication in the packet which identifies the time when the packet was sent and while storing the actual time on device A. The indication may be a counter or unique identifier in the packet which can be correlated to the actual time stored on device A. The timestamp may indicate the value of the clock of device A when the packet is sent.

Device B may receive the test packet at $t_1$ from Device A and send a second packet 704 back to the device A at $t_2$. The second packet 704 may be an acknowledgement packet which indicates to device A receipt of the first packet 702 by device B. The acknowledgement packet may contain the timestamp originally sent in the test packet and/or timestamp(s) corresponding to $t_1$ and/or $t_2$. Device A may receive the acknowledgement packet at $t_3$ as indicated by its local clock. Device A may then determine network latency and/or jitter based on receipt of the acknowledgment packet.

A difference between when the packet is sent (e.g., indicated by the timestamp in the acknowledgment) to when it was received, optionally subtracting the processing time of device B, e.g., $(t_3-t_0)-(t_2-t_1)$, may be a round trip time of the packet. One half of this value may be indicative of a one-way trip time between device A and device B. This one-way trip time may be the latency of the network, assuming that processing time associated with receiving the first packet 702 and sending the second packet 704 at device B (represented by the difference between $t_1$ and $t_2$) is negligible or accounted for. Variations in the one-way times can indicative of jitter. Several determinations of one-way times by device A and device B can be performed and averaged together to provide a mean latency and a mean jitter of the communication network 606. The mean latency and mean jitter may be a characterization of the condition of the communication network 606. This characterization may be performed prior to playback of audio or video content or in the event that the network is known or suspected to have latency or jitter beyond a desired amount.

Two or more media devices, audio playback devices, or video devices playing back audio and video content in synchrony may present the audio, video, or media content at the same time or within a time period no more than the frame rate. However, each device may have its own local clock used for timing and playback of the audio and video content, and these clocks may not be synchronized. In this regard, the initiating device 502 may provide timing information to the synching device 504. The timing information may enable the synching device 504 to present content at substantially the same time that the initiating device 502 presents content, achieving sufficient synchronization for audio content being played by one device and video content being played by another device. Sufficient synchronization, in some examples, may be characterized as "lip-synchronization" between the audio and video content.

Figure 8:
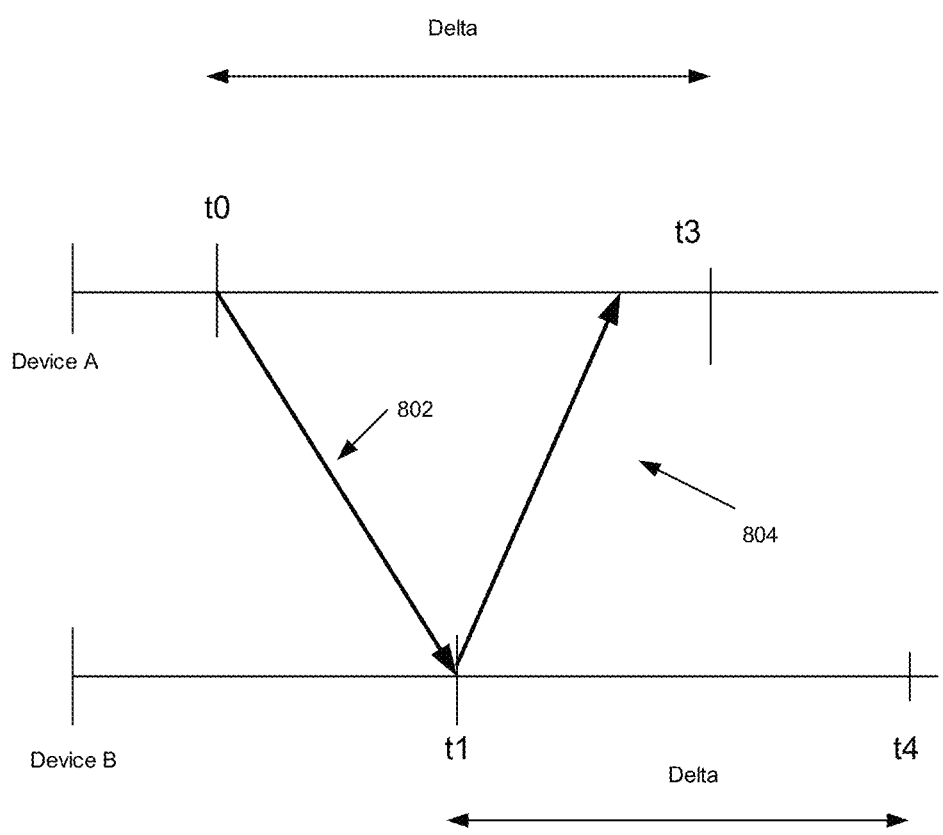
FIG. 8 is an example timing diagram for synchronizing networked devices.

FIG. 8 shows an example of communication timing between device A, the initiating device 502, and device B, the synching device 504, for achieving synchronous playback of audio and video. Device A and device B may each have a local clock for maintaining timing information. The timing of the local clocks may drift over time causing loss of synchronization between the local clock of the initiating device and the local clock of the synching device.

Device A and device B may establish communications over the communication network 506. Playback of audio or video content begins by the device A sending a packet 802 to device B at time to. The packet may have an identifier of content to play and an indication of when to play back the content.

Figure 9:
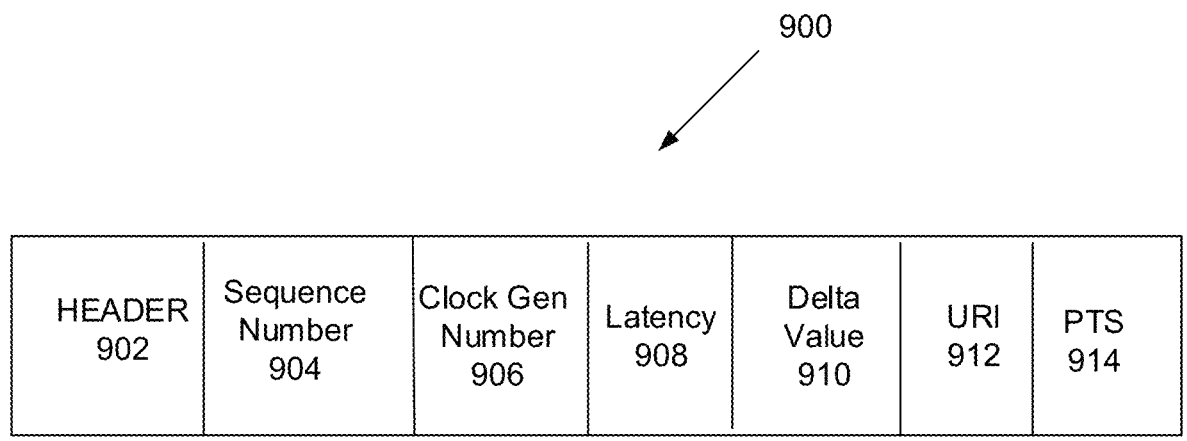
FIG. 9 is an example packet associated with synchronizing network devices.

FIG. 9 illustrates an example of the packet 802. The packet 900 may define a header 902. The header 902 may define routing information so that the communication network can route the packet from device A to device B.

The packet may also define a data field. The data field may include one or more of a sequence number 904, a clock generation number 906, a latency 908, a delta value 910, a URI 912, and a presentation timestamp (PTS) 914. The URI 912 may be an address, hyper-text, or link, for example, to indicate the location of content on a remote device, which may be on the initiating device 502, the server 508, or some other device on the communication network 506. Additionally, the sequence number 904 may be a number or indication which uniquely identifies the packet. The delta value may indicate when to playback the audio or video content, e.g., when the playback is to start. This delta value may be a length of time defined as a difference in time between a time on the local clock of the initiating device 502 when the packet is sent and when the content is to be played by the initiating device 502. An example delta value may be greater than the mean latency of the network but no more than a frame rate of the content. Additionally, the packet 802 may define a clock generation number 906 which is associated with changes or updates to a presentation offset. The packet 802 may also have a presentation timestamp (PTS) 914 which indicates where in audio content or video content, for example, playback of the content is to start.

Figure 10:
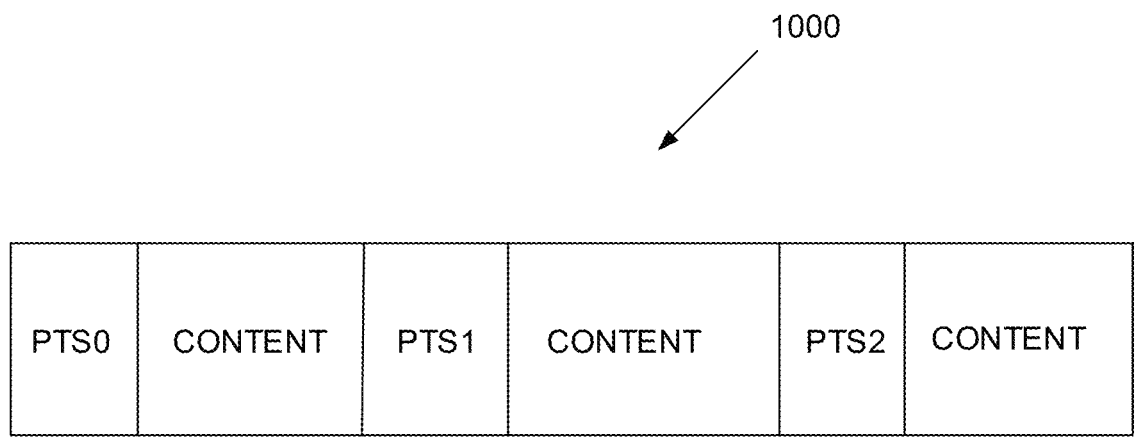
FIG. 10 is an example format of media content.

FIG. 10 is an example format of a video sequence, audio sequence, or audio/video sequence that represents content to be played by the initiating device 502 and the synching device 504. The content may comprise one or more audio or video frames or packets that have a plurality of presentation timestamps. The presentation timestamps may identify a place in the audio or video content. For example, PTS0 may represent the beginning of the video or audio content, PTS1 may indicate content 30 seconds into the video or audio sequence, and PTS2 may indicate content 60 seconds into the video or audio sequence. In this regard, the video or audio sequence may define one or more PTS so that the synching device 604 may play back the same content, either audio or video content, in synchronization with the initiating device 502.

In some examples, device A may send the packet 802 a plurality of times to the synching device. Device A may send the packet 802 multiple times to account for possible packet loss on the communication network 506. Each packet 802 sent by the initiating device to the synching device may have a sequence number and a clock generation number. Additionally, for example, the sequence number may increase for each packet. This way device B can distinguish multiple such packets and process each of them only once.

Referring back to FIG. 8, device B may receive the packet 802 at $t_1$ over the communication network 506. Device B may extract the URI, the delta value and the PTS from the packet.

Figure 11:
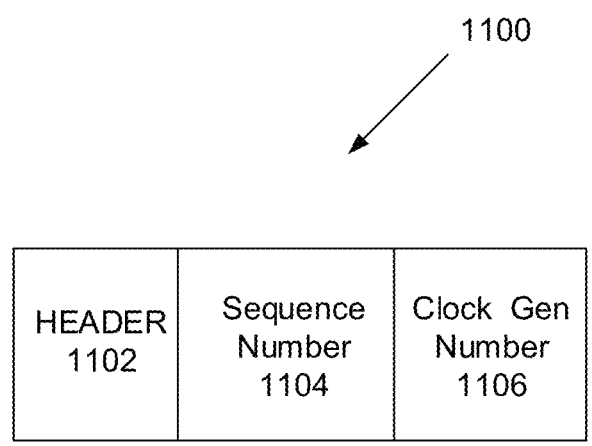
FIG. 11 is an example packet associated with synchronizing network devices.

In some embodiments, device B may send an acknowledgement packet 804 back to the initiating device. FIG. 11 shows an example of the acknowledgement packet 1100. The acknowledgement packet 1100 may have various fields similar to the packet 802. The acknowledgement packet 1100 may have a header 1102 with addressing information for routing the packet from the synching device to the initiating device. Further, the acknowledgment packet 1100 may have one or more identifiers, such as the sequence number 1104 and/or clock generation number 1106 received in the packet 1100. The clock generation number 1106 may uniquely identify a clock associated with playback timing and a change may indicate a change in the clock timing, for example, if there is a discontinuity in playback or error in the timing. The acknowledgement packet 1100 may contain one or more of the sequence number 1104 and/or clock generation number 1106 so as to indicate to device A receipt of the packet 802 by device B.

At this point, device A and device B may be ready to play the content indicated by the URI. The URI may indicate, for example, where on the server 508 the content is located.

Device A and/or device B may obtain the content to play based on the identifier of content to play. The content may include audio content, video content, or a combination of audio and video content. If device A is an audio playback device, the audio playback device may disregard the video content during playback. Alternatively, if device B is a video playback device, then the video playback device may disregard the audio content during playback. Other arrangements are also possible for the location of the content and mechanism for playback.

Both devices may be playing back the same content indicated by the URI, albeit one device may play back video content and the other device may play back the audio content corresponding to the video content. Further, each device may play the content starting at the identified presentation timestamp in the packet.

Additionally, audio and video frames may have different frame lengths and the specified PTS may not apply to the content being played by the device. For instance, the PTS may be for video frames but not audio frames, and the device is playing audio frames. To accommodate this, a device may play content after the indicated presentation time depending on the content type. For instance, a device may account for the difference by applying an appropriate correction to the delta value so as to maintain proper presentation of content as between the two devices.

Referring back again to FIG. 8, the synching device may determine a local clock time to play the content. In this regard, the delta value may indicate the time the initiating device, device A, will play the content. For instance, the delta value may indicate that the content at the presentation timestamp may play on the initiating device 502 at a time equal to the local clock time of the initiating device 502 plus the delta value. This is shown as $t_3$. Similarly, the synching device 504 may use the delta value with its time of the local clock on the synching device to determine when to play the content. For instance, the time to play the content on the synching device 504 may be at a time equal to the local clock time of the synching device plus the delta value, as shown as $t_4$. Because of the latency and jitter of the communication network 506, the playback time $t_3$ and $t_4$ may not be exactly the same. But as long a difference between $t_3$ and $t_4$ is within the allowable limits for perception of lip-sync, such as 40 ms for video, the audio and video playback may be sufficiently synchronized.

As an example, the delta value may be defined as 10 ms. If the local clock of the synching device 504 indicates 1000 ms, then the content at the presentation timestamp may be played back on the synching device when the local clock equals 1010 ms. Similarly, if the local clock of the initiating device 502 indicates 1005 ms, then the content at the presentation timestamp may be played back on the initiating device when the local clock of the initiating device equals 1015 ms.

In some examples, the delta may be subtracted by the mean network latency depending on network conditions. For instance, if the network conditions are not low latency, then the mean latency may be subtracted from the delta value. The initiating device 502 may perform the subtraction and send the delta value, as corrected, to the synching device 504. Alternatively, the synching device 504 may perform the subtraction. In this case, the initiating device 502 may provide the synching device 504 with the latency value in the packet 802 or at some other time. This corrected delta value may be used to determine when to play back the content in a manner similar to what was discussed above.

In some examples the delta may be subtracted by a minimum network latency depending on network conditions. For instance, if the network conditions are not low latency, then a smallest calculated network latency may be subtracted from the delta value. The initiating device 502 may perform the subtraction and send the delta value, as corrected, to the synching device 504. Alternatively, the synching device 504 may perform the subtraction. In this case, the initiating device 502 may provide the synching device 504 with the latency value in the packet 802 or at some other time. This corrected delta value may be used to determine when to play back the content in a manner similar to what was discussed above.

Before $t_3$ and before $t_4$, the initiating device 502 and synching device 504 may obtain, respectively, the content to play based on the identifier of content to play. This identifier may be the URI in some instances.

The initiating device 502 and synching device 504 may then play the obtained content. The content may be played at the identified PTS in synchrony based on the time of respective local clocks, e.g., $t_3$ or $t_4$ respectively. After playback of the first frame, the initiating and synching device may refer to subsequent presentation timestamps, PTS2, PTS3 etc. in the content to present subsequent frames of content, based on the timing of the respective local clocks. For example, if the presentation timestamps in the content indicates to play a frame each 40 ms, then each frame may be played at a time every 40 ms as timed by the local clock for both the initiating device 502 and the synching device 504.

The initiating device 502 may send updates to various parameters identified in the packet 802 to the synching device 504. The updates may be sent in the form of a synchronization packet. These updates may need only to be sent in one direction from the initiating device 502 to the playback device 504 thus yielding a unidirectional synchronization for content playback.

Figure 12:
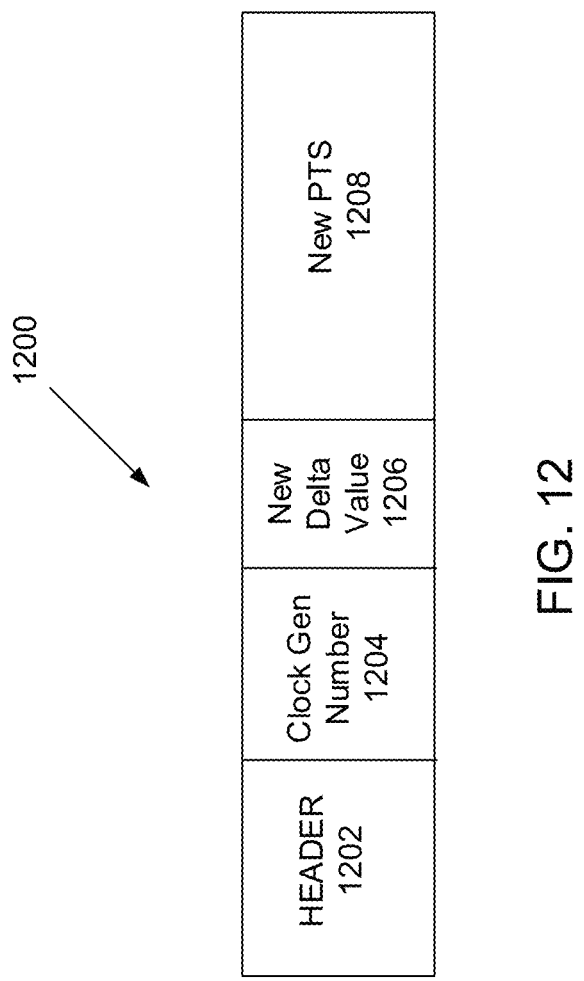
FIG. 12 is an example packet associated with synchronizing network devices.

FIG. 12 illustrates an example synchronization packet 1200. The synchronization packet 1200 sent by the initiating device to the synching device 504 may have a header 1202 and one or more updated parameters. The header 1202 may contain addressing information for routing the packet from the initiating device to the synching device, for example. The updated parameters may include a clock generation number 1204, a new received new delta value 1206, and a new PTS 1208.

The new presentation timestamp 1208 may define a new place in the content to synchronize.

The new delta value 1206 may refer to the time in the future that the referenced content will play. For instance, the timing of the local clock may drift over time. In embodiments, the synching device 504 may adjust a clock speed of its local clock, e.g., a rate of playback, based on this received new delta value 1206 and the new presentation offset that it calculates therewith.

The clock generation number 1204 may uniquely associate the received new delta value 1206 and/or PTS 1208 to the appropriate clock maintained by the synching device. These clocks may be physical or virtual clocks.

Figure 13:
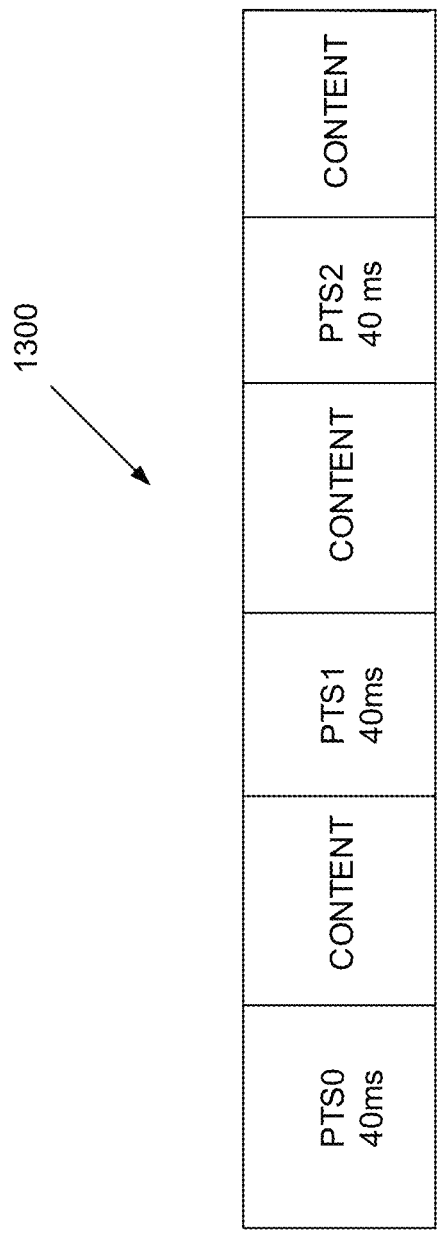
FIG. 13 is another example format of media content.

FIG. 13 shows an example format of content, e.g., an audio or video frame(s) 1300, to be played back by the synching device 504 showing timing information. The format may have a plurality of presentation timestamps (PTS) and content associated with each PTS. The PTS may indicate the time when the associated content (e.g., frame) is to be played back. For instance, the PTS may indicate playback of content at each PTS every 40 ms. If the local clock is 1000 ms, when the content associated with PTS0 is played, then the content at PTS1 should be played back at 1040 ms, and the content at PTS3 should be played back at 1080 ms. Subtracting the time that the PTS should be played from the current time of the local clock, may indicate an expected delta value based on the local clock when the content is to be played by the synching device 504. The received new delta value may indicate when the audio content at the PTS should be presented. The variation, e.g., presentation offset, between the expected delta value and the received new delta value indicated in the synchronization may be used to adjust the local clock on the synching device 504. Specifically, the ratio of the difference between the expected delta value and the received new delta value and the received new delta value can be used to adjust the speed of the local clock on the synchronizing device:

(Delta E-DeltaR)/(Delta_R)

where Delta_E is the expected length of time until playback of a frame and Delta_R is the received new delta value or new length of time until playback of the frame (also referred to as new delta value).

The ratio can be multiplied, for example, by the time of the local clock on the synching device 504 to achieve this correction. By the initiating device 502 providing the received new delta value 1206, the rate of playback of the synching device 604 may be adjusted without requiring bidirectional communication.

As an example of this update, consider a local clock indicating a time of 1500 ms. The next frame of content as indicated by the PTS is to be played at 1520 ms. Accordingly, the device may playback the content in 20 ms, an expected length of time until playback of a frame. A received new delta value may indicate playback of the content in 25 ms. Accordingly, the speed of the local clock is adjusted based on this 5 ms difference, e.g., the presentation offset.

The synchronization packet 1200 may be sent periodically. Each synchronization packet 1200 with a received new delta value 1206 received by the synching device 504 may be used to update the local clock speed. Alternatively, only those received new delta values in a synchronization packet which are less than a predefined threshold amount may be used to update the local clock speed. Still alternatively, if a difference between Delta_E and Delta_R for a synchronization frame is negative, then the local clock speed may be adjusted.

In other embodiments, the local clock speed may be adjusted at a defined interval. The interval may be a fixed or variable time since a last adjustment of the local clock speed or every N synchronization packets that is received. The received new delta values in the plurality of synchronization packets received during the interval may be used to update local clock speed. For example, for each synchronization frame received, a difference between Delta_E and Delta_R may be calculated for that frame. The lowest difference within the interval may be used to adjust the local clock speed. Alternatively, for each synchronization frame received, a difference between Delta_E and Delta_R is calculated for that frame and the local clock speed may adjusted based on an average of the differences during the interval. Other variations are also possible.

The synchronization packet 1200 may also have a new clock generation number 1206 and sequence number 1208. If a new value of a clock generation number 1206 is provided, then any previous adjustments to the speed of the local clock should be discarded and a raw or uncorrected local clock time should be used in determining timing of playback. In essence, receipt of these numbers may indicate that the timing relationship between the clocks on the initiating device 502 and the synching device 502 should be reset.

Figure 14:
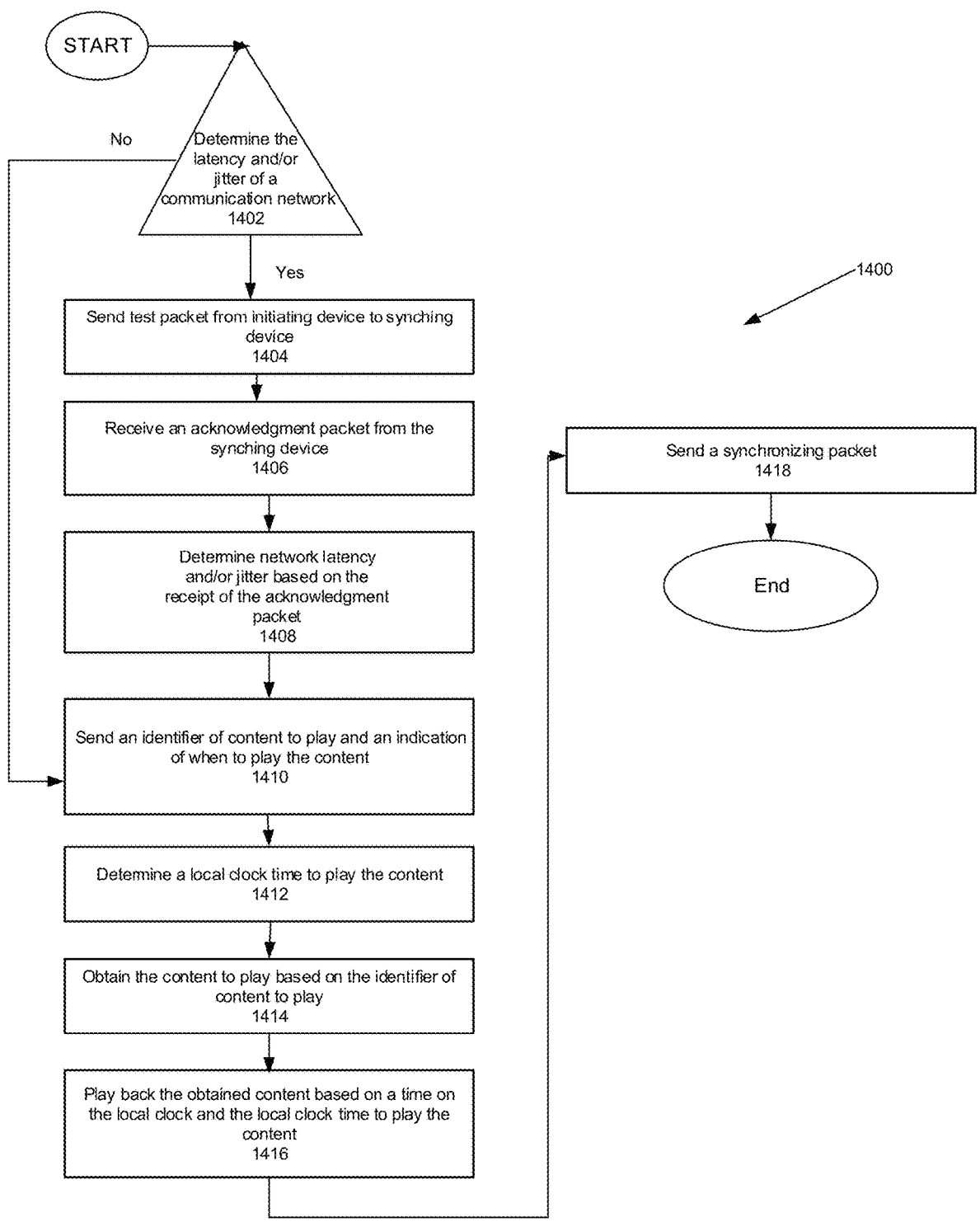
FIG. 14 is an example flow diagram for achieving synchronization between networked devices.

Method 1400 shown in FIG. 14 presents an embodiment of a method that can be implemented within the disclosed operating environment. Method 1400 and the other process disclosed herein may include one or more operations, functions, or actions as illustrated by one or more of blocks 1402 to 1416. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 1400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 14 may represent circuitry that is wired to perform the specific logical functions in the process.

Referring back, FIG. 14 is an example flow chart 1400 of operations associated with playback of media in synchronization between an initiating device and a synching device from the perspective of the initiating device. At 1402, a decision is made whether to determine the latency and/or jitter of a communication network. At 1404, if the latency and/or jitter is to be determined, then a test packet is sent from an initiating device to a synching device. At 1406, the initiating device receives an acknowledgment packet to the test packet from the synching device. At 1408, a network latency or jitter is determined based on the receipt of the acknowledgment packet. At 1410, the initiating device may send an identifier of content to play and an indication of when to play the content. The initiating device may send the identifier and indication in the form of a packet to the synching device. At 1412, the initiating device may determine a local clock time to play the content. At 1414, the initiating device obtains the content to play based on the identifier of content to play. For example, the initiating device may obtain the content from a server. At 1416, the initiating device plays back the obtained content based on a time on the local clock and the local clock time to play the content. For instance, the time on the local clock may match the local clock time to play the content. At 1418, a synchronization packet may be sent from the initiating device to the synching device. The synchronization packet may be used by the synching device to determine a new presentation offset.

Figure 15:
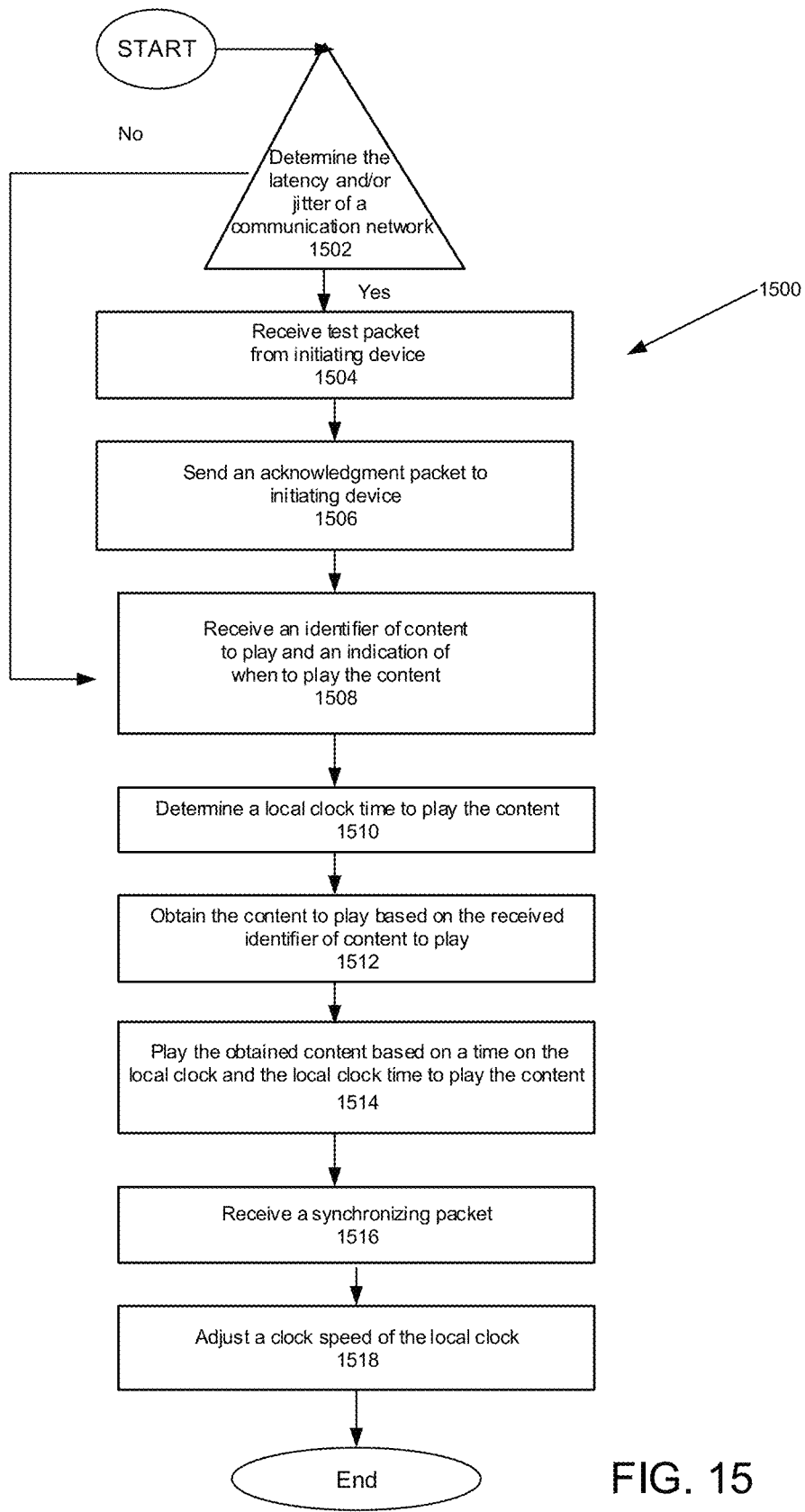
FIG. 15 is an example flow diagram for achieving synchronization between networked devices.

FIG. 15 is an example flow chart 1500 which illustrates operations associated with playback of media in synchronization between an initiating device and a synching device from the perspective of the synching device. At 1502, if the latency and/or jitter is to be determined, then at 1504, a test packet may be received from an initiating device. At 1506, the synching device may send an acknowledgment packet to the test packet back to the initiating device. At 1508, the synching device may receive a packet from the initiating device with an identifier of content to play and an indication of when to play the content. At 1510, the synching device may determine a local clock time to play the content. The local clock time may be based on a local clock of the initiating device and the indication of when to play the content. In some examples, a network latency may be accounted for in the determination of the local clock time to play the content. At 1512, the synching device may obtain the content to play based on the received identifier of content to play. At 1514, the synching device may play the obtained content based on a time on the local clock and the local clock time to play the content. For instance, the time on the local clock may match the local clock time to play the content. At 1516, the synching device may receive a synchronization packet. At 1516, the synching device may adjust a clock speed of the local clock. The adjustment may to control rate of playback of the content based on this synchronization packet.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A media playback system comprising:
   a control device comprising:
      a network interface configured to wirelessly communicate using a BLUETOOTH communication protocol;
      a user interface configured to detect input from a user;
      at least one processor;
      at least one non-transitory computer-readable medium;
      program instructions stored on the at least one non-transitory computer-readable medium that are executable by the at least one processor such that the control device is configured to:
         receive, via the user interface, a command to initiate playback of media content, wherein the media content comprises video content and audio content associated with the video content; and
         transmit, via the network interface, at least one message to a video playback device based on the command; and
   the video playback device comprising:
      a first network interface configured to wirelessly communicate using the BLUETOOTH communication protocol;
      a second network interface configured to communicate over at least one local area network (LAN);
      at least one processor;
      at least one non-transitory computer-readable medium; and
      program instructions stored on the at least one non-transitory computer-readable medium that are executable by the at least one processor such that the video playback device is configured to:
         join a synchrony group with at least one audio playback device;
         receive, via the first network interface, the at least one message from the control device;
         obtain, via the second network interface, the media content based on the at least one message;
         determine an indication of when to begin playback of the media content;
         transmit, via the second network interface, the indication of when to begin playback of the media content to the at least one audio playback device;
         based on the indication of when to begin playback of the media content, output the video content in lip-synchrony with playback of the corresponding audio content by the at least one audio playback device; and
         while the video content is output in lip-synchrony with playback of the corresponding audio content by the at least one audio playback device, transmit, via the second network interface, timing information to the at least one audio playback device to maintain lip-synchrony with playback of the corresponding audio content by the at least one audio playback device, wherein the transmitted timing information causes the at least one audio playback device to modify a playback rate of the corresponding audio content.

2. The media playback system of claim 1, wherein the video playback device is a television comprising a display and wherein the program instructions that are executable by the at least one processor such that the video playback device is configured to output the video content comprises program instructions that are executable by the at least one processor such that the video playback device is configured to display the video content on the display.

3. The media playback system of claim 1, wherein the control device is a first control device and wherein the media playback system further comprises a second control device comprising:
   a network interface configured to communicate over at least one LAN;
   a user interface configured to detect input from a user;
   at least one processor;
   at least one non-transitory computer-readable medium; and
   program instructions stored on the at least one non-transitory computer-readable medium that are executable by the at least one processor such that the second control device is configured to:
      receive, via the user interface, a command to modify the synchrony group; and
      cause the synchrony group to be modified based on the received command to modify the synchrony group.

4. The media playback system of claim 3, wherein the program instructions that are executable by the at least one processor such that the second control device is configured to cause the synchrony group to be modified comprises program instructions that are executable by the at least one processor such that the second control device is configured to transmit at least one message to the video playback device.

5. The media playback system of claim 4, wherein the program instructions that are executable by the at least one processor such that the video playback device is configured to join the synchrony group with the at least one audio playback device comprises program instructions that are executable by the at least one processor such that the video playback device is configured to join the synchrony group with the at least one audio playback device based on the at least one message from the second control device.

6. The media playback system of claim 1, wherein the media content comprises a plurality of frames and wherein the program instructions that are executable by the at least one processor such that the video playback device is configured to transmit the timing information comprises program instructions that are executable by the at least one processor such that the video playback device is configured to transmit at least one packet comprising an amount of time until playback of at least one of the plurality of frames.

7. The media playback system of claim 1, wherein the media content comprises a plurality of frames and wherein the program instructions that are executable by the at least one processor such that the video playback device is configured to transmit the timing information comprises program instructions that are executable by the at least one processor such that the video playback device is configured to transmit at least one packet comprising a presentation timestamp for at least one of the plurality of frames.

8. The media playback system of claim 1, wherein the video playback device further comprises program instructions that are executable by the at least one processor such that the video playback device is configured to determine a network latency for a connection between the video playback device and the at least one audio playback device and wherein the program instructions that are executable by the at least one processor such that the video playback device is configured to determine the indication of when to begin playback of the media content comprises program instructions that are executable by the at least one processor such that the video playback device is configured to determine the indication of when to begin playback of the media content based on the determined network latency.

9. The media playback system of claim 8, wherein the program instructions that are executable by the at least one processor such that the video playback device is configured to determine the indication of when to begin playback of the media content comprises program instructions that are executable by the at least one processor such that the video playback device is configured to:
   send a test packet to the at least one audio playback device at a first time based on a local clock of the video playback device;
   receive an acknowledgement packet from the at least one audio playback device at a second time based on the local clock of the video playback device;
   determine a test packet delay calculation based on a difference between the second time and the first time; and
   determine the network latency based on the test packet delay calculation.

10. The media playback system of claim 1, wherein the video playback device further comprises:
   an audio amplifier; and
   a speaker coupled to the audio amplifier.

11. The media playback system of claim 1, wherein the at least one audio playback device comprises a first playback device and wherein the playback system further comprises the first playback device.

12. The media playback system of claim 11, wherein the first playback device comprises:
   a network interface configured to communicate over the LAN;
   an audio amplifier;
   a speaker coupled to the audio amplifier;
   at least one processor;
   at least one non-transitory computer-readable medium; and
   program instructions stored on the at least one non-transitory computer-readable medium that are executable by the at least one processor such that the first playback device is configured to:
      receive, via the network interface, the indication of when to begin playback of the media content from the video playback device;
      based on the indication of when to begin playback of the media content, play back the corresponding audio content in lip-synchrony with the video playback device using the audio amplifier and the speaker; and
      while playing back the corresponding audio content in lip-synchrony with playback of the video content by the video playback device,
         receive, via the second network interface, the timing information from the video playback device; and
         modify the playback rate of the corresponding audio content based on the timing information.

13. A method performed by a media playback system comprising a control device and a video playback device, the method comprising:
   receiving, via a user interface of the control device, a command to initiate playback of media content, wherein the media content comprises video content and audio content associated with the video content; and
   transmitting, via a network interface of the control device using a BLUETOOTH communication protocol, at least one message to the video playback device based on the command;
   receiving, via a first network interface of the video playback device using the BLUETOOTH communication protocol, the at least one message from the control device;
   obtaining, via a second network interface of the video playback device, the media content based on the at least one message;
   determining, using the video playback device, an indication of when to begin playback of the media content;
   transmitting, via the second network interface of the video playback device, the indication of when to begin playback of the media content to at least one audio playback device;
   based on the indication of when to begin playback of the media content, outputting, using the video playback device, the video content in lip-synchrony with playback of the corresponding audio content by the at least one audio playback device; and
   while outputting the video content in lip-synchrony with playback of the corresponding audio content by the at least one audio playback device, transmitting, via the second network interface of the video playback device, timing information to the at least one audio playback device to maintain lip-synchrony with playback of the corresponding audio content by the at least one audio playback device, wherein the transmitted timing information causes the at least one audio playback device to modify a playback rate of the corresponding audio content.

14. The method of claim 13, wherein outputting the video content comprises displaying, via a display on the video device, the video content.

15. The method of claim 13, wherein the control device is a first control device and wherein the method further comprises:
   receiving, via a user interface of a second control device, a command to modify a synchrony group; and
   causing, via the second control device, the synchrony group to be modified based on the received command to modify the synchrony group.

16. The method of claim 15, wherein causing the synchrony group to be modified comprises transmitting, via the second control device, at least one message to the video playback device.

17. The method of claim 16, wherein joining the synchrony group with the at least one audio playback device comprises joining the synchrony group with the at least one audio playback device based on the at least one message from the second control device.

18. The method of claim 13, wherein the media content comprises a plurality of frames and wherein transmitting the timing information comprises:
   transmitting, via the video playback device to the at least one audio playback device, at least one packet comprising an amount of time until playback of at least one of the plurality of frames.

19. The method of claim 13, wherein the media content comprises a plurality of frames and wherein transmitting the timing information comprises:
   transmitting, via the video playback device to the at least one audio playback device, at least one packet comprising a presentation timestamp for at least one of the plurality of frames.

20. The media playback system of claim 1, wherein causing the at least one audio playback device to modify a playback rate of the corresponding audio content comprises causing the at least one audio playback device to modify a local clock rate based on the transmitted timing information.

\* \* \* \* \*